US007987935B2

United States Patent
Ichimoto

(10) Patent No.: US 7,987,935 B2
(45) Date of Patent: Aug. 2, 2011

(54) POWER OUTPUT APPARATUS AND VEHICLE EQUIPPED WITH THE SAME, AND METHOD FOR CONTROLLING POWER OUTPUT APPARATUS

(75) Inventor: Kazuhiro Ichimoto, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 411 days.

(21) Appl. No.: 12/076,746

(22) Filed: Mar. 21, 2008

(65) Prior Publication Data

US 2008/0236913 A1    Oct. 2, 2008

(30) Foreign Application Priority Data

Mar. 28, 2007  (JP) ................................. 2007-084737

(51) Int. Cl.
*B60W 10/06* (2006.01)
*B60W 10/08* (2006.01)

(52) U.S. Cl. .......... 180/65.28; 180/309; 60/274; 60/287

(58) Field of Classification Search ............... 180/65.21, 180/65.265, 65.275, 65.28, 65.285, 65.29, 180/309; 60/297, 274, 292, 324, 287, 301
See application file for complete search history.

(56) References Cited

U.S. PATENT DOCUMENTS

| | | | | |
|---|---|---|---|---|
| 5,693,877 A | * | 12/1997 | Ohsuga et al. | 73/114.75 |
| 6,321,530 B1 | * | 11/2001 | Hoshi et al. | 60/274 |
| 6,327,852 B1 | * | 12/2001 | Hirose | 60/297 |
| 6,378,298 B2 | * | 4/2002 | Harima et al. | 60/288 |
| 6,947,824 B1 | * | 9/2005 | Livshiz et al. | 701/103 |
| 7,341,699 B2 | * | 3/2008 | Thieman et al. | 422/177 |
| 7,444,803 B2 | * | 11/2008 | Iwamoto et al. | 60/288 |
| 7,463,970 B2 | * | 12/2008 | Livshiz et al. | 701/114 |

FOREIGN PATENT DOCUMENTS

| | | |
|---|---|---|
| JP | 2000-257452 A | 9/2000 |
| JP | 2000-303828 A | 10/2000 |

* cited by examiner

*Primary Examiner* — John D Walters
(74) *Attorney, Agent, or Firm* — Kenyon & Kenyon LLP

(57) ABSTRACT

When an exhaust gas switching valve is in a closed state, a target rotation speed Ne* and a target torque Te* are set in the same way as when the exhaust gas switching valve is in an open state to control an engine (S120, S130). A motor torque command Tm1* is set by using the target torque Te* corrected by a correction torque ΔT based on an engine rotation speed Ne, and also a motor torque command Tm2* is set so that a torque demand Tr* is delivered to a drive shaft to control motors MG1 and MG2 (S150 to S230). Thereby, since the exhaust gas switching valve is in a closed state, even if the output from the engine decreases, the engine and the motors MG1 and MG2 can be controlled properly.

8 Claims, 8 Drawing Sheets

POWER OUTPUT APPARATUS AND VEHICLE EQUIPPED WITH THE SAME, AND METHOD FOR CONTROLLING POWER OUTPUT APPARATUS

BACKGROUND

1. Technical Field

The present invention relates to a power output apparatus and a vehicle equipped with the same, and a method for controlling the power output apparatus.

2. Related Art

Conventionally, as a power output apparatus of this type, there has been proposed an apparatus in which the exhaust system of an engine has an adsorbent for adsorbing unburned fuel, and when abnormality occurs in a valve for guiding exhaust gas to the adsorbent, an alarm lamp comes on (for example, refer to Japanese Patent Laid-Open No. 2000-257452). Also, there has been proposed an apparatus in which the exhaust system of an engine has an adsorbent for adsorbing unburned fuel, and when the unburned fuel having adsorbed onto the adsorbent is released from the adsorbent, the engine is operated in an oxygen excess state, and also the decrease in output of the engine is compensated by a motor (for example, refer to Japanese Patent Laid-Open No. 2000-303828 and Japanese Patent Laid-Open No. 2003-343253).

SUMMARY

In the power output apparatus having an adsorbent for adsorbing unburned fuel in the exhaust system of an internal combustion engine, the exhaust pressure of the internal combustion engine fluctuates in some cases depending on how exhaust gas is guided to the adsorbent. The fluctuations in exhaust pressure of the internal combustion engine cause fluctuations in output of the internal combustion engine, so that in some cases, the required power cannot be delivered. Also, measures must be taken when abnormality occurs in a valve for guiding exhaust gas to the adsorbent.

The power output apparatus and the vehicle equipped with the same, and the method for controlling the power output apparatus in accordance with the present invention have one object of outputting a driving power demand to a drive shaft regardless of whether or not exhaust gas is guided to the adsorbent. Also, the power output apparatus and the vehicle equipped with the same, and the method for controlling the power output apparatus in accordance with the present invention have another object of more properly controlling an internal combustion engine and an electric motor to output a driving power demand to the drive shaft depending on whether or not exhaust gas is guided to the adsorbent.

The power output apparatus and the vehicle equipped with the same, and the method for controlling the power output apparatus in accordance with the present invention took measures described below to achieve at least a part of the above-described objects.

The present invention is directed to a power output apparatus for delivering power to a drive shaft. The power output apparatus includes: an internal combustion engine; an electric power-mechanical power input output mechanism which is connected to the drive shaft and also rotatably connected to the output shaft of the internal combustion engine independently of the drive shaft to input and output power to and from the drive shaft and the output shaft along with the input and output of electric power and mechanical power; an electric motor capable of delivering power to the drive shaft; an accumulator unit capable of sending and receiving electric power to and from the electric power-mechanical power input output mechanism and the electric motor; an exhaust gas purifying unit which is arranged in the exhaust system of the internal combustion engine, and has a purification catalyst section having a purification catalyst for purifying exhaust gas, a fuel gas adsorbing section having a fuel gas adsorbent for adsorbing fuel gas in exhaust gas, and a flow switching section for switching from a first flow that allows exhaust gas to flow mainly to the purification catalyst section to a second flow that allows all exhaust gas to flow to the purification catalyst section via the fuel gas adsorbing section and vice versa; a driving power demand setting unit for setting a driving power demand required to the drive shaft; and a control module for controlling the internal combustion engine, the electric power-mechanical power input output mechanism, and the electric motor so that a driving power based on the set driving power demand is delivered to the drive shaft based on a switching state of the flow switching section of the exhaust gas purifying unit.

In the power output apparatus of the invention, the internal combustion engine, the electric power-mechanical power input output mechanism, and the electric motor are controlled so that the driving power based on the driving power demand required to the drive shaft is delivered to the drive shaft based on a switching state of a flow switching section of exhaust gas purifying unit for switching from a first flow that allows exhaust gas to flow mainly to the purification catalyst section to a second flow that allows all exhaust gas to flow to the purification catalyst section via the fuel gas adsorbing section and vice versa. That is to say, the internal combustion engine, the electric power-mechanical power input output mechanism, and the electric motor are controlled so that the driving power based on the driving power demand is delivered to the drive shaft depending on whether the first flow is formed or the second flow is formed by the flow switching section. Thereby, the internal combustion engine, the electric power-mechanical power input output mechanism, and the electric motor can be controlled properly because the driving power demand is delivered to the drive shaft depending on whether the first flow is formed or the second flow is formed by the flow switching section, and the driving power based on the driving power demand can be delivered to the drive shaft regardless of whether the first flow is formed or the second flow is formed by the flow switching section.

In one preferable embodiment of the power output apparatus of the invention, the control module is a module for controlling the internal combustion engine, the electric power-mechanical power input output mechanism, and the electric motor so that a driving power based on the set driving power demand is delivered to the drive shaft assuming that the output state of the internal combustion engine is a normal state when the switching state of the flow switching section is a state in which exhaust gas is allowed to flow by the first flow, and controlling the internal combustion engine, the electric power-mechanical power input output mechanism, and the electric motor so that a driving power based on the set driving power demand is delivered to the drive shaft assuming that the output state of the internal combustion engine is a state in which power cannot be delivered as compared with the normal state when the switching state of the flow switching section is a state in which exhaust gas is allowed to flow by the second flow. In this embodiment, by allowing exhaust gas to flow by the second flow, measures can be taken against the decrease in output of the internal combustion engine caused by the rise in exhaust pressure of the internal combustion engine.

In another preferable embodiment of the power output apparatus of the invention of a mode in which control is carried out assuming that the output state of the internal combustion engine is a state in which power cannot be output as compared with the normal state when the switching state of the flow switching section is a state in which exhaust gas is allowed to flow by the second flow, the control module can be a module for controlling the internal combustion engine, the electric power-mechanical power input output mechanism, and the electric motor so that the target rotation speed and the target torque of the internal combustion engine are set based on the set driving power demand and a predetermined restriction, the internal combustion engine is operated by the set target rotation speed and target torque, and the driving power based on the set driving power demand is delivered to the drive shaft when the switching state of the flow switching section is a state in which exhaust gas is allowed to flow by the first flow, and controlling the internal combustion engine, the electric power-mechanical power input output mechanism, and the electric motor so that the target rotation speed and the target torque are set by being corrected in the output decreasing direction from the target rotation speed and the target torque set based on the set driving power demand and the predetermined restriction, the internal combustion engine is operated by the set target rotation speed and target torque, and the driving power based on the set driving power demand is delivered to the drive shaft when the switching state of the flow switching section is a state in which exhaust gas is allowed to flow by the second flow. Thus, when the switching state of the flow switching section is a state in which exhaust gas is allowed to flow by the second flow, measures can be taken by correcting the target rotation speed and the target torque in the normal state. In this case, the control module can be a module for setting the target rotation speed and the target torque by correcting only the target torque so as to be small when the switching state of the flow switching section is a state in which exhaust gas is allowed to flow by the second flow. Further, in this case, the embodiment can be made such that the power output apparatus further includes an engine rotation speed detecting module for detecting the engine rotation speed, which is the rotation speed of the internal combustion engine, and the control module is a module for setting the target rotation speed and the target torque by correcting the target torque by a correction amount that is larger as the detected engine rotation speed is higher when the switching state of the flow switching section is a state in which exhaust gas is allowed to flow by the second flow. Since the exhaust pressure of the internal combustion engine for the switching state of the flow switching section depends on the rotation speed of the internal combustion engine, by correcting the target torque based on the rotation speed of the internal combustion engine, measures can be taken more properly and easily against the decrease in output of the internal combustion engine at the time when the switching state of the flow switching section is a state in which exhaust gas is allowed to flow by the second flow.

In still another preferable embodiment of the power output apparatus of the invention, the exhaust gas purifying unit is a unit in which the purification catalyst section is arranged over the whole of a rear stage of the flow path of exhaust gas and also the fuel gas adsorbing section is arranged in a part of a front stage of the flow path of exhaust gas, and the flow switching section is attached to a remaining portion of the front stage of the flow path of exhaust gas of the exhaust gas purifying unit and is provided with a valve for opening and closing the remaining portion. In this embodiment, the first flow and the second flow can be switched over by a valve operation only.

In still another preferable embodiment of the power output apparatus of the invention, the electric power-mechanical power input output mechanism is a mechanism having a generator for inputting and outputting power and a three shaft-type power input output module that is connected to the drive shaft, the output shaft, and the rotating shaft of the generator, and inputs and outputs power, based on a power input to and output from any two shafts of the three shafts, to and from the remaining shaft.

The present invention is also directed to a vehicle. The vehicle includes: an internal combustion engine; an electric power-mechanical power input output mechanism which is connected to a drive shaft connected to an axle and also rotatably connected to the output shaft of the internal combustion engine independently of the drive shaft to input and output power to and from the drive shaft and the output shaft along with the input and output of electric power and mechanical power; an electric motor capable of delivering power to the drive shaft; an accumulator unit capable of sending and receiving electric power to and from the electric power-mechanical power input output mechanism and the electric motor; an exhaust gas purifying unit which is arranged in the exhaust system of the internal combustion engine, and has a purification catalyst section having a purification catalyst for purifying exhaust gas, a fuel gas adsorbing section having a fuel gas adsorbent for adsorbing fuel gas in exhaust gas, and a flow switching section for switching from a first flow that allows exhaust gas to flow mainly to the purification catalyst section to a second flow that allows all exhaust gas to flow to the purification catalyst section via the fuel gas adsorbing section and vice versa; a driving power demand setting unit for setting a driving power demand required to the drive shaft; and a control module for controlling the internal combustion engine, the electric power-mechanical power input output mechanism, and the electric motor so that a driving power based on the set driving power demand is delivered to the drive shaft based on a switching state of the flow switching section of the exhaust gas purifying unit.

In the vehicle of the invention, the internal combustion engine, the electric power-mechanical power input output mechanism, and the electric motor are controlled so that the driving power based on the driving power demand required to the drive shaft is delivered to the drive shaft based on a switching state of a flow switching section of exhaust gas purifying unit for switching from a first flow that allows exhaust gas to flow mainly to the purification catalyst section to a second flow that allows all exhaust gas to flow to the purification catalyst section via the fuel gas adsorbing section and vice versa. That is to say, the internal combustion engine, the electric power-mechanical power input output mechanism, and the electric motor are controlled so that the driving power based on the driving power demand is delivered to the drive shaft depending on whether the first flow is formed or the second flow is formed by the flow switching section. Thereby, the internal combustion engine, the electric power-mechanical power input output mechanism, and the electric motor can be controlled properly because the driving power demand is delivered to the drive shaft depending on whether the first flow is formed or the second flow is formed by the flow switching section, and the driving power based on the driving power demand can be delivered to the drive shaft regardless of whether the first flow is formed or the second flow is formed by the flow switching section.

The present invention is also directed to a method for controlling a power output apparatus. The power output apparatus includes an internal combustion engine; an electric power-mechanical power input output mechanism which is connected to a drive shaft and also rotatably connected to the output shaft of the internal combustion engine independently of the drive shaft to input and output power to and from the drive shaft and the output shaft along with the input and output of electric power and mechanical power; an electric motor capable of delivering power to the drive shaft; an accumulator unit capable of sending and receiving electric power to and from the electric power-mechanical power input output mechanism and the electric motor; and an exhaust gas purifying unit which is arranged in the exhaust system of the internal combustion engine, and has a purification catalyst section having a purification catalyst for purifying exhaust gas, a fuel gas adsorbing section having a fuel gas adsorbent for adsorbing fuel gas in exhaust gas, and a flow switching section for switching from a first flow that allows exhaust gas to flow mainly to the purification catalyst section to a second flow that allows all exhaust gas to flow to the purification catalyst section via the fuel gas adsorbing section and vice versa. In the method for controlling the power output apparatus, when the switching state of the flow switching section is a state in which exhaust gas is allowed to flow by the first flow, assuming that the output state of the internal combustion engine is a normal state, the internal combustion engine, the electric power-mechanical power input output mechanism, and the electric motor are controlled so that a driving power based on a driving power demand required to the drive shaft is delivered to the drive shaft, and when the switching state of the flow switching section is a state in which exhaust gas is allowed to flow by the second flow, assuming that the output state of the internal combustion engine is a state in which power cannot be delivered as compared with the normal state, the internal combustion engine, the electric power-mechanical power input output mechanism, and the electric motor are controlled so that a driving power based on the driving power demand is delivered to the drive shaft.

In the method for controlling the power output apparatus of the invention, the internal combustion engine, the electric power-mechanical power input output mechanism, and the electric motor are controlled so that the driving power based on the driving power demand required to the drive shaft is delivered to the drive shaft assuming that the output state of internal combustion engine is the normal state when the switching state of the flow switching section for switching from the first flow that allows exhaust gas to flow mainly to the purification catalyst section to the second flow that allows all exhaust gas to flow to the purification catalyst section via the fuel gas adsorbing section and vice versa, and when the switching state of the flow switching section is a state in which exhaust gas is allowed to flow by the second flow, assuming that the output state of internal combustion engine is a state in which power cannot be output as compared with the normal state, the internal combustion engine, electric power-mechanical power input output mechanism, and electric motor are controlled so that the driving power based on the driving power demand is delivered to the drive shaft. Thereby, the internal combustion engine, the electric power-mechanical power input output mechanism, and the electric motor can be controlled properly because the driving power demand is delivered to the drive shaft depending on whether the first flow is formed or the second flow is formed by the flow switching section, and the driving power based on the driving power demand can be delivered to the drive shaft regardless of whether the first flow is formed or the second flow is formed by the flow switching section. The reason why it is assumed that the output state of internal combustion engine is a state in which power cannot be output as compared with the normal state when exhaust gas is allowed to flow by the second flow is that if exhaust gas is allowed to flow by the second flow, the exhaust pressure of the internal combustion engine rises.

DESCRIPTION OF THE PREFERRED EMBODIMENTS

Figure 1:
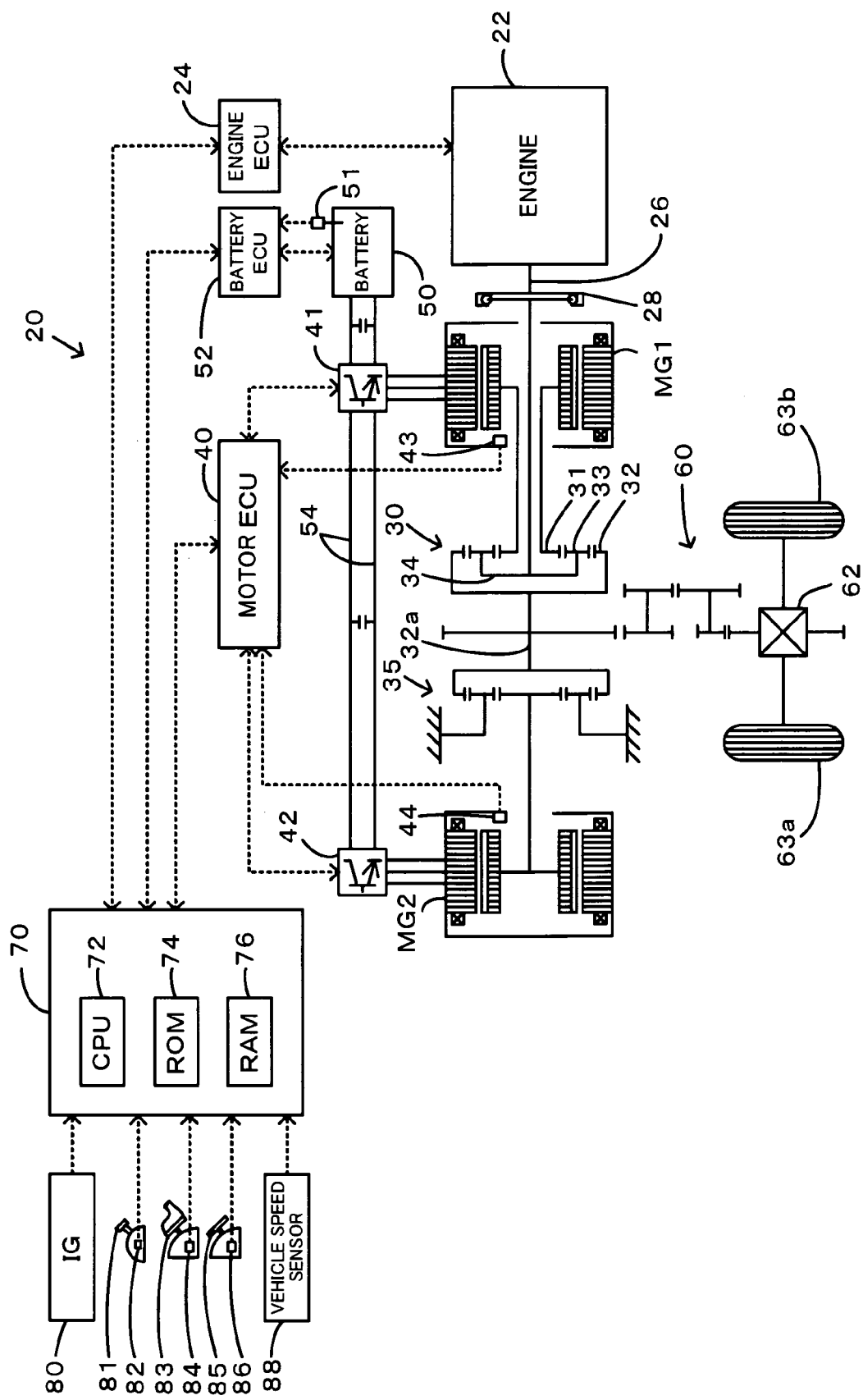
FIG. 1 is a configuration view showing the outline of a configuration of a hybrid vehicle 20 in accordance with one embodiment of the present invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

Figure 2:
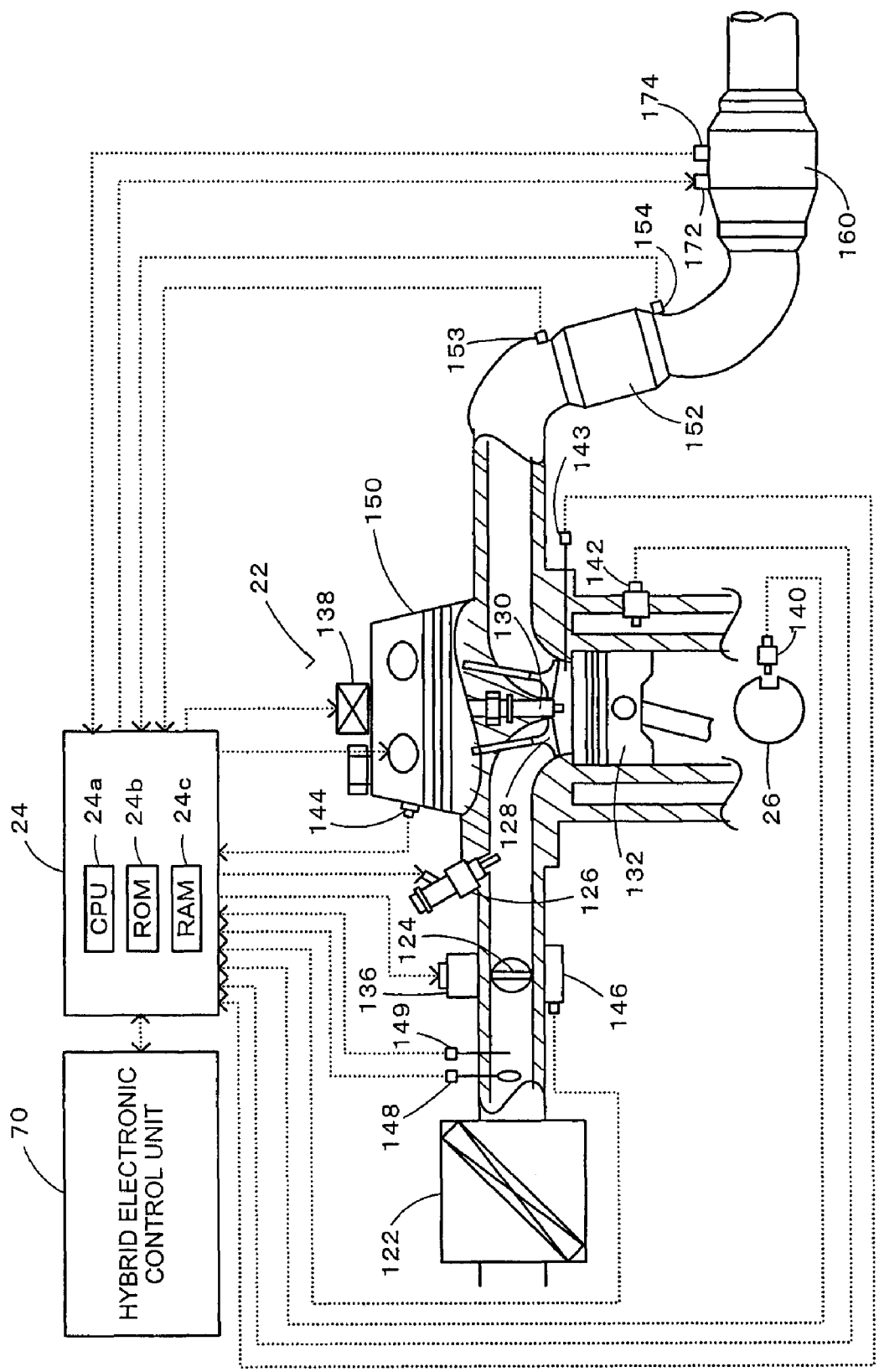
FIG. 2 is a configuration view showing the outline of a configuration of an engine 22.

The engine 22 is formed as an internal combustion engine capable of delivering power by using a hydrocarbon-based fuel such as gasoline or light oil. As shown in FIG. 2, in the engine 22, the air having been cleaned by an air cleaner 122 is sucked via a throttle valve 124, and also gasoline is injected from a fuel injection valve 126 and is mixed with the sucked air. This air-fuel mixture is sucked into a combustion chamber via an intake valve 128, and is explosively burned by an electric spark produced by an ignition plug 130. The reciprocating motion of a piston 132 pushed down by the explosive energy is converted into the rotating motion of the crankshaft 26. Exhaust gas from the engine 22 is discharged to the outside air via a first purifier 152 having a catalyst (three way catalyst) for purifying harmful components such as carbon monoxide (CO), hydrocarbon (HC), and nitrogen oxides (NOx) and a second purifier 160 having an HC adsorbing section for adsorbing unburned fuel (hereinafter referred to as "HC").

Figure 3:
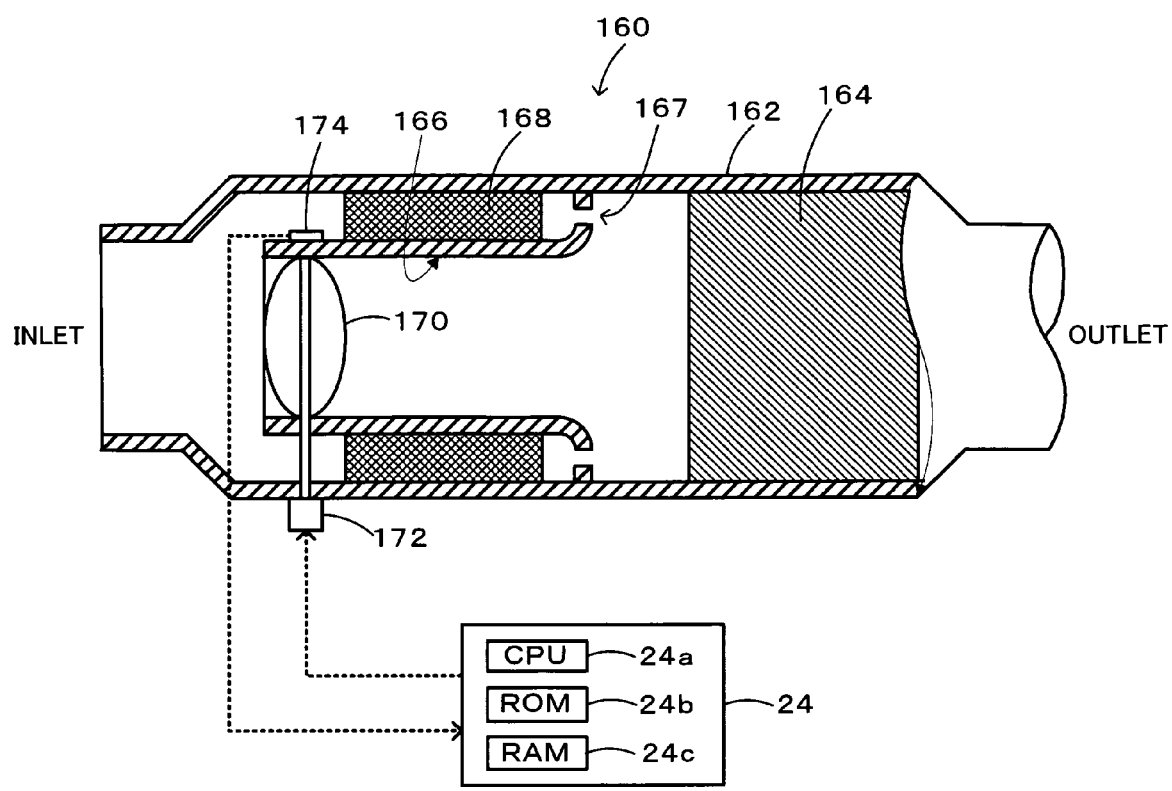
FIG. 3 is a configuration view showing the outline of a configuration of an exhaust gas switching valve 170.

As shown in FIG. 3, the second purifier 160 includes an expanded cylindrical outer case 162, an inner case 166 that is arranged in an approximately half portion on the inlet side of exhaust gas on the inside of the outer case 162 and forms a cylindrical flow path in the center thereof, a cylindrical HC adsorbing section 168 that is arranged in an annular space formed by the outer case 162 and the inner case 166 and has an adsorbent for adsorbing unburned fuel, a catalyst purifying section 164 that is arranged in an approximately half portion on the outlet side of exhaust gas on the inside of the outer case 162 and has the catalyst (three way catalyst), an exhaust gas switching valve 170 attached to an inflow port of exhaust gas of the inner case 166, and an actuator 172 for driving the exhaust gas switching valve 170 to open and close the valve. The end part on the outlet side of exhaust gas of the inner case 166 is attached to the outer case 162, and near the end part, a plurality of through holes 167 are formed. Therefore, when the exhaust gas switching valve 170 is closed, the exhaust gas flowing into the second purifier 160 goes through the annular space in which the HC adsorbing section 168 is arranged and goes to the catalyst purifying section 164 via the through holes 167, and is discharged from the outlet after passing through the catalyst purifying section 164. That is to say, the exhaust gas passes through the HC adsorbing section 168 and the catalyst purifying section 164 and is discharged. On the other hand, when the exhaust gas switching valve 170 is open, the exhaust gas mainly goes through the exhaust gas switching valve 170 and is discharged after passing through the catalyst purifying section 164, and some of the exhaust gas passes through the catalyst purifying section 164 via the HC adsorbing section 168 and is discharged. The three way catalyst of the first purifier 152 and the catalyst purifying section 164 is composed of an oxidation catalyst such as platinum (Pt) and palladium (Pd), a reduction catalyst such as rhodium (Rh), a co-catalyst such as ceria ($CeO_2$), and the like. The three way catalyst is activated at a high temperature to purify carbon monoxide (CO) contained in exhaust gas and fuel (HC) into water ($H_2O$) and carbon dioxide ($CO_2$) by the action of the oxidation catalyst and purify nitrogen oxides (NOx) contained in exhaust gas into nitrogen ($N_2$), oxygen ($O_2$), and the like by the action of the reduction catalyst. The HC adsorbent in the HC adsorbing section 168 is composed of zeolite, and adsorbs HC at a low temperature and releases the adsorbed HC at a high temperature. Therefore, by closing the exhaust gas switching valve 170, HC is adsorbed temporarily by the HC adsorbing section 168, and subsequently the adsorbed HC can be released as the temperature of the HC adsorbing section 168 rises.

The engine 22 is controlled by an engine electronic control unit (hereinafter referred to as an engine ECU) 24. The engine ECU 24 is configured as a microprocessor mainly including a CPU 24a, and has, in addition to the CPU 24a, a ROM 24b for storing processing programs, a RAM 24c for storing data temporarily, and input and output ports and a communication port, not shown. To the engine ECU 24, signals from various sensors for detecting the state of the engine 22, for example, a crank position from a crank position sensor 140 for detecting the rotational position of the crankshaft 26, a cooling water temperature from a water temperature sensor 142 for detecting the temperature of cooling water for the engine 22, an in-cylinder pressure Pin from a pressure sensor 143 provided in a combustion chamber, a cam position from a cam position sensor 144 for detecting the rotational position of a camshaft that opens and closes the intake valve 128 and an exhaust valve for performing air supply and exhaust to and from the combustion chamber, a throttle position from a throttle valve position sensor 146 for detecting the position of the throttle valve 124, an air flowmeter signal from an air flowmeter 148 attached to an intake pipe, an intake air temperature from a temperature sensor 149 attached to the intake pipe in the same way, an air-fuel ratio from an air-fuel ratio sensor 153, an oxygen signal from an oxygen sensor 154, and an exhaust gas switching valve position from an exhaust gas switching valve position sensor 174 for detecting the position of the exhaust gas switching valve 170 are sent via the input port. Also, from the engine ECU 24, various control signals for driving the engine 22, for example, a drive signal to the fuel injection valve 126, a drive signal to a throttle motor 136 for regulating the position of the throttle valve 124, a control signal to an ignition coil 138 integrated with an igniter, a control signal to a variable valve timing mechanism 150 capable of changing the opening and closing timing of the intake valve 128, and a drive signal to the actuator 172 are sent out via the output port. The engine ECU 24 communicates with the hybrid electronic control unit 70, so that based on a control signal from the hybrid electronic control unit 70, the engine ECU 24 controls the operation of the engine 22, and also sends out data about the operating state of the engine 22 as necessary. The engine ECU 24 also calculates the rotation speed of the crankshaft 26, that is, the rotation speed Ne of the engine 22 based on the crank position sent from the crank position sensor 140.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 calculates the rotation speeds Nm1 and Nm2 of the motors MG1 and MG2 based on the signals from the rotational position detection sensors 43 and 44.

The battery 50 is controlled by a battery electronic control unit (hereinafter referred to as a battery ECU) 52. To the battery ECU 52, signals necessary for controlling the battery 50, for example, an inter-terminal voltage from a voltage sensor, not shown, provided between the terminals of the battery 50, a charge-discharge current from a current sensor, not shown, attached to the power line 54 connected to the output terminal of the battery 50, and a battery temperature Tb from a temperature sensor 51 attached to the battery 50 are sent. From the battery ECU 52, data about the state of the battery 50 are sent out to the hybrid electronic control unit 70 by communication as necessary. Also, the battery ECU 52 calculates a state of charge (SOC) based on the integrated value of the charge-discharge current detected by the current sensor to control the battery 50, and calculates the input and output limits Win and Wout, which are the maximum allowable power that allows the charge and discharge of the battery 50, based on the calculated state of charge (SOC) and the battery temperature Tb. The input and output limits Win and Wout of the battery 50 can be set by setting the basic values of the input and output limits Win and Wout based on the battery temperature Tb, by setting an output limit correction factor and an input limit correction factor based on the state of charge (SOC) of the battery 50, and by multiplying the set basic values of the input and output limits Win and Wout by a correction factor.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 4:
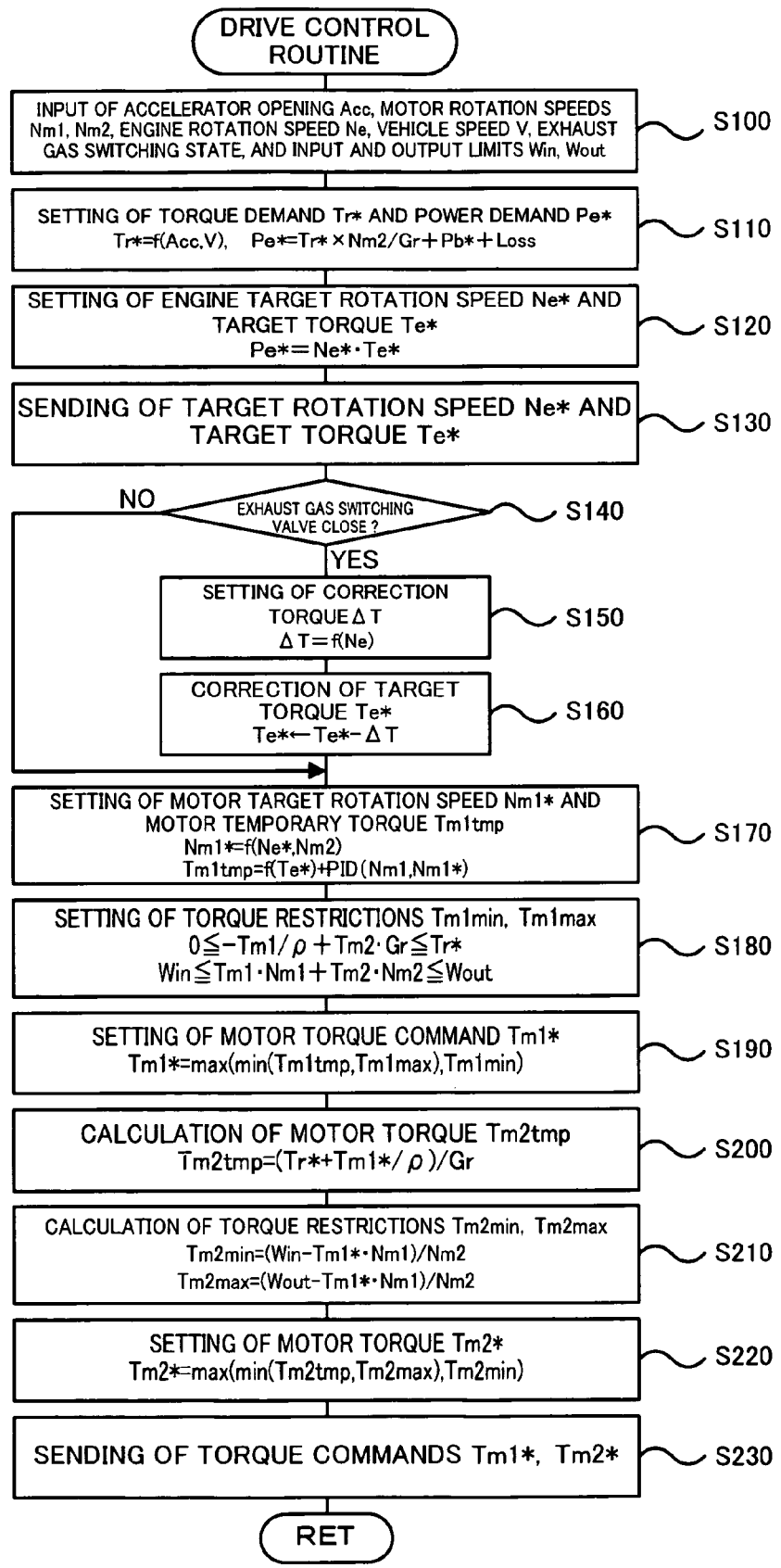
FIG. 4 is a flowchart showing one example of a drive control routine executed by a hybrid electronic control unit 70 in accordance with an embodiment.

Next, the operation of the hybrid vehicle 20 of the embodiment configured as described above is explained. FIG. 4 is a flowchart showing one example of a drive control routine executed by the hybrid electronic control unit 70. This routine is executed repeatedly at predetermined time intervals (for example, at several milliseconds intervals).

When the drive control routine is executed, the CPU 72 of the hybrid electronic control unit 70 first executes processing for inputting data necessary for control, such as the accelerator opening Acc from the accelerator pedal position sensor 84, the vehicle speed V from the vehicle speed sensor 88, the rotation speed Ne of the engine 22, the rotation speeds Nm1 and Nm2 of the motors MG1 and MG2, the exhaust gas switching state as the state of the exhaust gas switching valve 170, and the input and output limits Win and Wout of the battery 50 (Step S100). In this step, for the rotation speed Ne of the engine 22, a rotation speed calculated based on the signal from the crank position sensor 140 is input by communication from the engine ECU 24. Also, for the rotation speeds Nm1 and Nm2 of the motors MG1 and MG2, rotation speeds calculated based on the rotational positions of rotors of the motors MG1 and MG2, which are detected by the rotational position detection sensors 43 and 44, are input by communication from the motor ECU 40. Further, for the input and output limits Win and Wout of the battery 50, limits set based on the battery temperature Tb of the battery 50 and the state of charge (SOC) of the battery 50 are input by communication from the battery ECU 52. Also, for the exhaust gas switching state as the state of the exhaust gas switching valve 170, a switching state based on the control state of the exhaust gas switching valve 170 formed by the engine ECU 24 is input by communication. The exhaust gas switching state as the state of the exhaust gas switching valve 170 includes a state at the time when abnormality occurs in the exhaust gas switching valve 170, that is, when the exhaust gas switching valve 170 sticks open or sticks closed.

Figure 5:
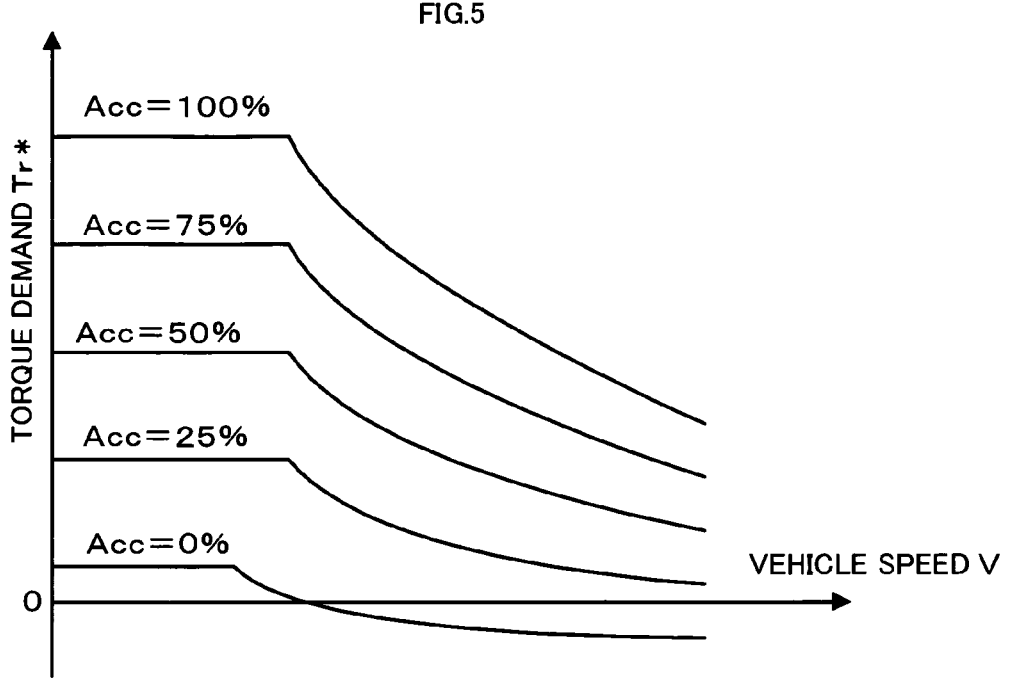
FIG. 5 is an explanatory view showing one example of a torque demand setting map.

After the data have been input in this manner, a torque demand Tr* to be output to the ring gear shaft 32*a* serving as the drive shaft connected to the drive wheels 63*a* and 63*b* as a torque required for the vehicle based on the input accelerator opening Acc and vehicle speed V and a power demand Pe* required for the engine 22 are set (Step S110). In this embodiment, the torque demand Tr* is set by storing the relationship between the accelerator opening Acc and vehicle speed V and the torque demand Tr*, which has been determined in advance, in the ROM 74 as a torque demand setting map and by deriving the corresponding torque demand Tr* from the stored map when the accelerator opening Acc and vehicle speed V are given. FIG. 5 shows one example of the torque demand setting map. The power demand Pe* can be calculated as the sum of a value obtained by multiplying the set torque demand Tr* by the rotation speed Nr of the ring gear shaft 32*a* and a charge/discharge power demand Pb* required by the battery 50 and a loss Loss. The rotation speed Nr of the ring gear shaft 32*a* can be determined by multiplying the vehicle speed V by a conversion factor k (Nr=k·V), or by dividing the rotation speed Nm2 of the motor MG2 by the gear ratio Gr of the reduction gear 35 (Nr=Nm2/Gr).

Figure 6:
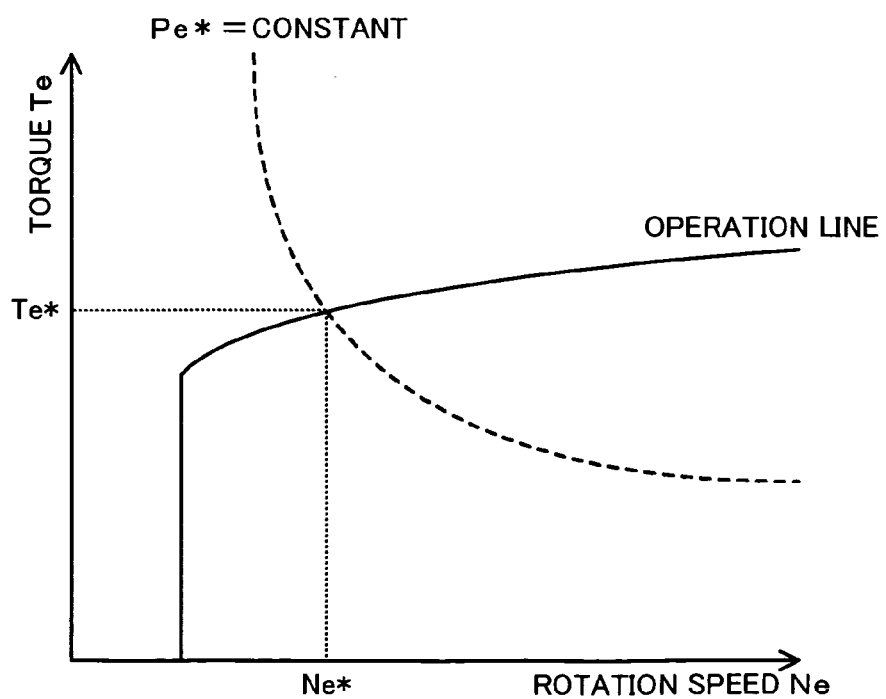
FIG. 6 is an explanatory view showing one example of the operation line of an engine 22 and a state of setting a target rotation speed Ne* and a target torque Te*.

Successively, a target rotation speed Ne* and a target torque Te* are set based on the set power demand Pe* as an operation point at which the engine 22 should be operated (Step S120), and the set target rotation speed Ne* and target torque Te* are sent to the engine ECU 24 (Step S130). The setting of the target rotation speed Ne* and the target torque Te* is performed based on an operation line that operates the engine 22 efficiently and the power demand Pe*. FIG. 6 shows one example of the operation line of the engine 22 and the state in which the target rotation speed Ne* and the target torque Te* are set. As shown in FIG. 6, the target rotation speed Ne* and the target torque Te* can be determined by the intersection of the operation line and a curve on which the power demand Pe* (Ne*×Te*) is constant. The engine ECU 24 that has received the target rotation speed Ne* and the target torque Te* carries out control such as intake air quantity control (throttle control), fuel injection control, and ignition control in the engine 22 so that the engine 22 is operated at an operation point indicated by the target rotation speed Ne* and the target torque Te*. By this control and the control of the motor MG1, described later, when the exhaust gas switching valve 170 is open, the engine 22 is rotated at the target rotation speed Ne* and is operated so that the target torque Te* is output.

Figure 7:
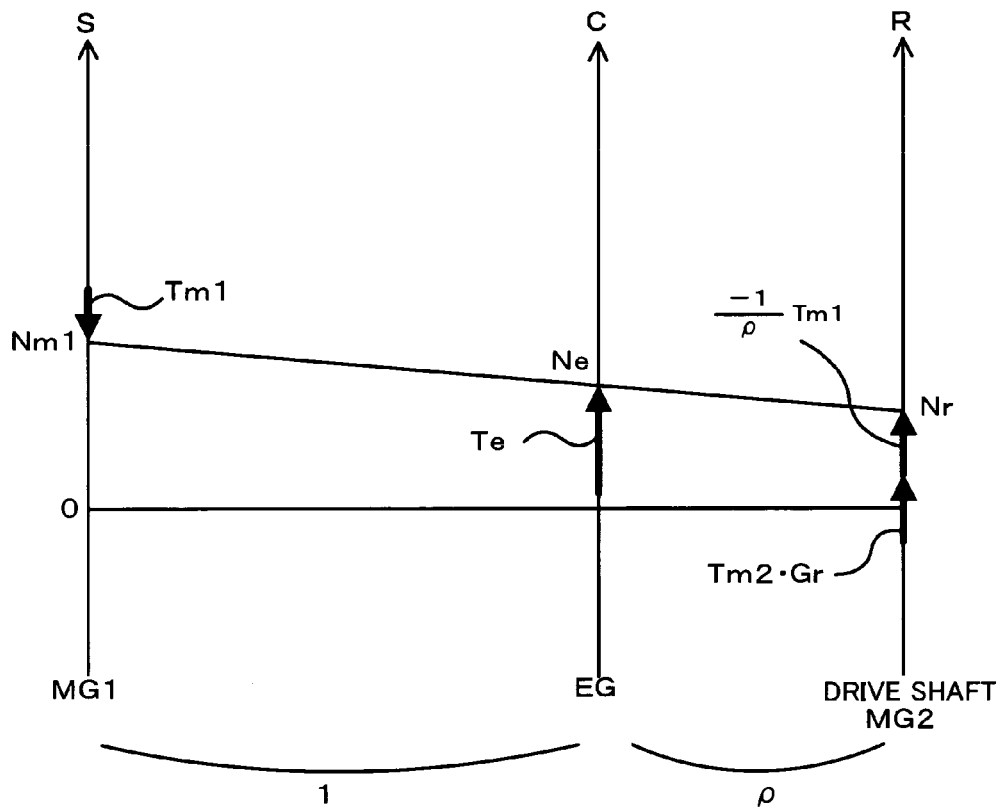
FIG. 7 is an explanatory view showing one example of an alignment chart showing the dynamic relationship between rotation speed and torque in a rotation element of a power distribution and integration mechanism 30 at the time when a vehicle is running in the state in which power is delivered from an engine 22 in an open state of an exhaust gas switching valve 170.

Next, the switching state of the exhaust gas switching valve 170, that is, the opening/closing state of the exhaust gas switching valve 170 is examined (Step S140). If it is judged that the exhaust gas switching valve 170 is in an open state, the target rotation speed Nm1* of the motor MG1 is calculated by Equation (1) using the target rotation speed Ne* of the engine 22, the rotation speed Nm2 of the motor MG2, and the gear ratio ρ of the power distribution and integration mechanism 30, and also a temporary torque Tm1*tmp*, which is a temporary value of torque to be delivered from the motor MG1, is calculated by Equation (2) based on the calculated target rotation speed Nm1* and the input rotation speed Nm1 of the motor MG1 (Step S170). Herein, Equation (1) is a dynamic relational expression for the rotation element of the power distribution and integration mechanism 30. FIG. 7 is an alignment chart showing the dynamic relationship between rotation speed and torque in the rotation element of the power distribution and integration mechanism 30 at the time when the vehicle is running in the state in which power is delivered from the engine 22 in an open state of the exhaust gas switching valve 170. In FIG. 7, the left S axis represents the rotation speed of the sun gear 31, which is the rotation speed Nm1 of the motor MG1, the C axis represents the rotation speed of the carrier 34, which is the rotation speed Ne of the engine 22, and the R axis represents the rotation speed Nr of the ring gear 32 obtained by dividing the rotation speed Nm2 of the motor MG2 by the gear ratio Gr of the reduction gear 35. Equation (1) can be derived easily by using this alignment chart. Two thick arrow marks on the R axis indicate a torque applied to the ring gear shaft 32*a* by the torque Tm1 delivered from the motor MG1 and a torque applied to the ring gear shaft 32*a* via a reduction gear 35 by the torque Tm2 delivered from the motor MG2. Also, Equation (2) is a relational expression in the feedback control for rotating the motor MG1 at the target rotation speed Nm1*. In Equation (2), "k1" in the second term on the right-hand side is a gain of proportional term, and "k2" in the third term on the right-hand side is a gain of integral term.

$$Nm1^* = Ne^* \cdot (1+\rho)/\rho - Nm2/\rho \tag{1}$$

$$Tm1tmp = \rho \cdot Te^*/(1+\rho) + k1(Nm1^* - Nm1) + K2\int(Nm1^* - Nm1)dt \tag{2}$$

Figure 8:
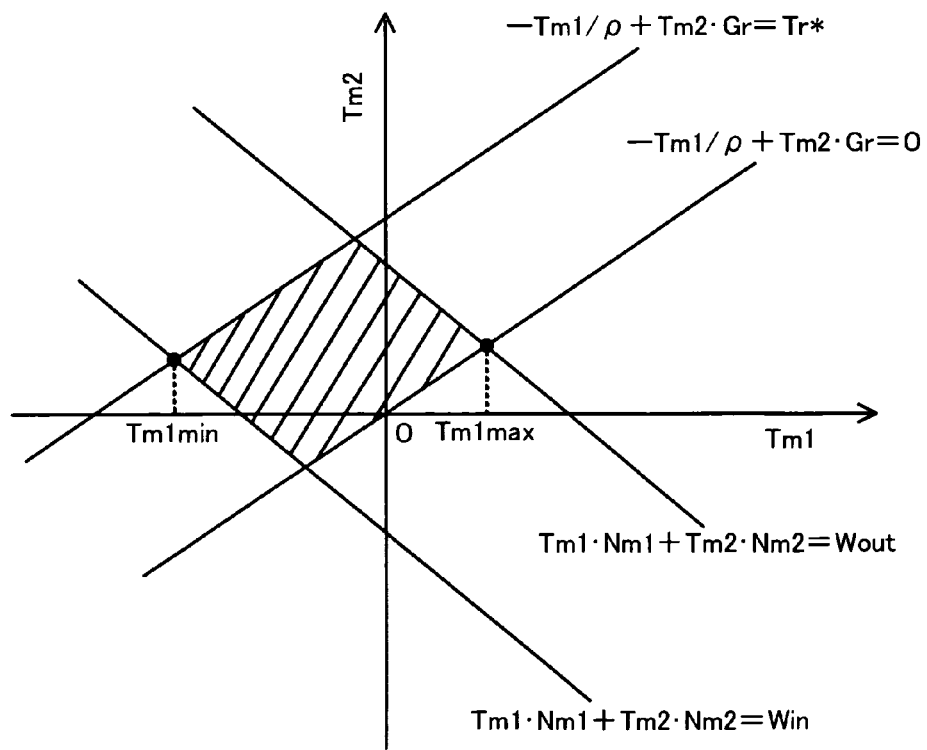
FIG. 8 is an explanatory view for explaining a state of setting torque restrictions Tm1min and Tm1max.

Successively, torque restrictions Tm1min and Tm1max are set as the upper and lower limits of torque that may be delivered from the motor MG1 satisfying both of Equation (3) and Equation (4) (Step S180). A torque command Tm1* of the motor MG1 is set by restricting the set temporary torque Tm1*tmp* by means of the torque restrictions Tm1min and Tm1max by Equation (5) (Step S190). Herein, Equation (3) represents the relationship such that the sum of torques delivered to the ring gear shaft 32*a* by the motor MG1 and the motor MG2 is in the range of value 0 to the torque demand Tr*, and Equation (4) represents the relationship such that the sum of electric powers delivered and received by the motor MG1 and the motor MG2 is in the range of the input limit Win to the output limit Wout. One example of torque restrictions Tm1min and Tm1max is shown in FIG. 8. The torque restrictions Tm1min and Tm1max can be determined as the minimum value and the maximum value of the torque command Tm1* in the region shown by hatching in FIG. 8.

$$0 \leq -Tm1/\rho + Tm2 \cdot Gr \leq Tr^* \tag{3}$$

$$Win \leq Tm1 \cdot Nm1 + Tm2 \cdot N_m2 \leq Wout \tag{4}$$

$$Tm1^* = \max(\min(Tm1tmp, Tm1\max), Tm1\min) \tag{5}$$

Then, a temporary torque Tm2*tmp*, which is the temporary value of torque to be delivered from the motor MG2, is calculated by Equation (6) by adding a value obtained by dividing the set torque command Tm1* by the gear ratio ρ of the power distribution and integration mechanism 30 to the torque demand Tr* and further by dividing the added result by the gear ratio Gr of the reduction gear 35 (Step S200), and torque restrictions Tm2min and Tm2max are calculated by Equations (7) and (8) as the upper and lower limits of torque that may be delivered from the motor MG2 by dividing a difference between the input and output limit Win, Wout of the battery 50 and the consumed power (generated power) of the motor MG1 obtained by multiplying the set torque command Tm1* by the present rotation speed Nm1 of the motor MG1 by the rotation speed Nm2 of the motor MG2 (Step S210). Then, the torque command Tm2* of the motor MG2 is set by restricting the set temporary torque Tm2*tmp* by means of the torque restrictions Tm2min and Tm2max by Equation (9) (Step S220). Herein, Equation (6) can be derived easily from the alignment chart of FIG. 7.

$$Tm2tmp = (Tr^* + Tm1^*/\rho)/Gr \quad (6)$$

$$Tm2\min = (Win - Tm1^* \cdot Nm1)/N_m 2 \quad (7)$$

$$Tm2\max = (Wout - Tm1^* \cdot Nm1)/N_m 2 \quad (8)$$

$$Tm2^* = \max(\min(Tm2tmp, Tm2\max), Tm2\min) \quad (9)$$

After the torque commands Tm1* and Tm2* of the motors MG1 and MG2 have been set as described above, the set torque commands Tm1* and Tm2* are sent to the motor ECU 40 (Step S230), by which the drive control routine is finished. The motor ECU 40 that has received the torque commands Tm1* and Tm2* carries out switching control of switching elements of the inverters 41 and 42 so that the motor MG1 is driven by the torque command Tm1* and the motor MG2 is driven by the torque command Tm2*.

Figure 9:
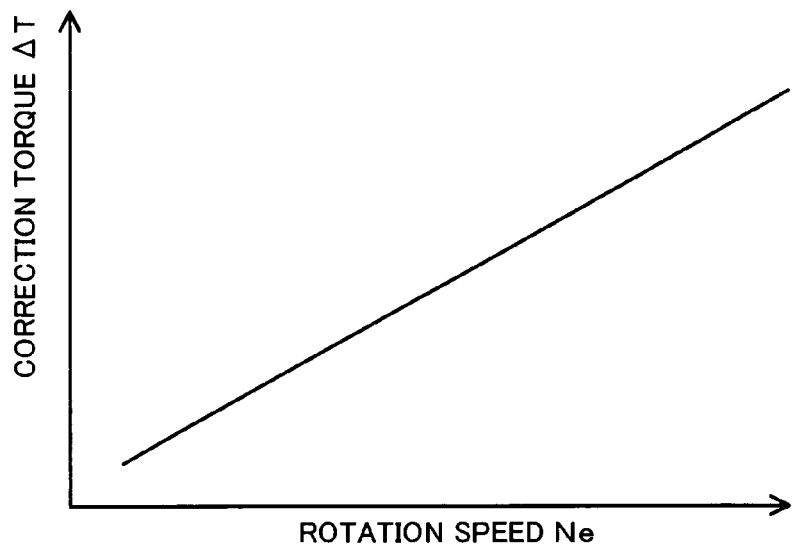
FIG. 9 is an explanatory view showing one example of a correction torque setting map.

If it is judged in Step S140 that the exhaust gas switching valve 170 is in a closed state, a correction torque ΔT is set based on the rotation speed Ne of the engine 22 (Step S150), and also a value obtained by subtracting the set correction torque ΔT from the target torque Te* is set as a new target torque Te* (Step S160). When the exhaust gas switching valve 170 is in a closed state, as seen from FIG. 3, exhaust gas flows to the catalyst purifying section 164 via the HC adsorbing section 168 and the through holes 167, so that the exhaust pressure of the engine 22 at the time when the exhaust gas switching valve 170 is in a closed state becomes higher than that at the time when the exhaust gas switching valve 170 is in an open state. Therefore, even if the engine 22 is controlled in the same way as when the exhaust gas switching valve 170 is in an open state, the intake air quantity of the engine 22 decreases, and accordingly the output torque from the engine 22 decreases. The exhaust pressure of the engine 22 increases with an increase in the rotation speed Ne of the engine 22. In this embodiment, considering these facts, the correction torque ΔT is set based on the rotation speed Ne of the engine 22 as a torque for correcting the target torque Te* when the exhaust gas switching valve 170 is in a closed state. That is to say, the correction torque ΔT is a torque corresponding to a decrease in output caused by the rise in exhaust pressure even if an attempt is made to deliver the target torque Te* from the engine 22 when the engine 22 rotates at the rotation speed Ne in the closed state of the exhaust gas switching valve 170. In this embodiment, the correction torque ΔT is stored in the ROM 74 as the correction torque setting map by determining, in advance, the relationship between the rotation speed Ne of the engine 22 and the correction torque ΔT at the time when the exhaust gas switching valve 170 is in a closed state by an experiment or the like, and when the rotation speed Ne of the engine 22 is given, the corresponding correction torque ΔT is derived from the map and is set. One example of the correction torque setting map is shown in FIG. 9.

The torque commands Tm1* and Tm2* of the motors MG1 and MG2 are set in Steps S170 through S230 by using the corrected target torque Te* and the target rotation speed Ne* set in Step S130, and the set torque commands Tm1* and Tm2* are sent to the motor ECU 40 (Step S230), by which the drive control routine is finished. Even when the exhaust gas switching valve 170 is in a closed state, the target rotation speed Ne* and the target torque Te* set in the same way as when the exhaust gas switching valve 170 is in an open state are sent to the engine ECU 24, by which the engine 22 is controlled. That is to say, even when the exhaust gas switching valve 170 is in a closed state, the engine ECU 24 carries out entirely the same intake air quantity control (throttle control), fuel injection control, and ignition control as those at the time when the exhaust gas switching valve 170 is in an open state. However, since the exhaust gas switching valve 170 is in a closed state, only a torque lower than the target torque Te* by the correction torque ΔT can be delivered by the engine 22. On the other hand, the motor MG1 is controlled by the torque command Tm1* set so that the engine 22 is rotated at the target rotation speed Ne* by using the feedforward term (the first term on the right-hand side of Equation (2)) based on the target torque Te* corrected by the correction torque ΔT, and the motor MG2 is controlled by the torque command Tm2* set as a difference between a torque that is delivered from the motor MG1 and acts on the ring gear shaft 32*a* serving as the drive shaft and the torque demand Tr*. Therefore, since the exhaust gas switching valve 170 is in a closed state, even if the output of the engine 22 decreases, the control does not fail, and the torque demand Tr* can be delivered to the ring gear shaft 32*a*.

Figure 10:
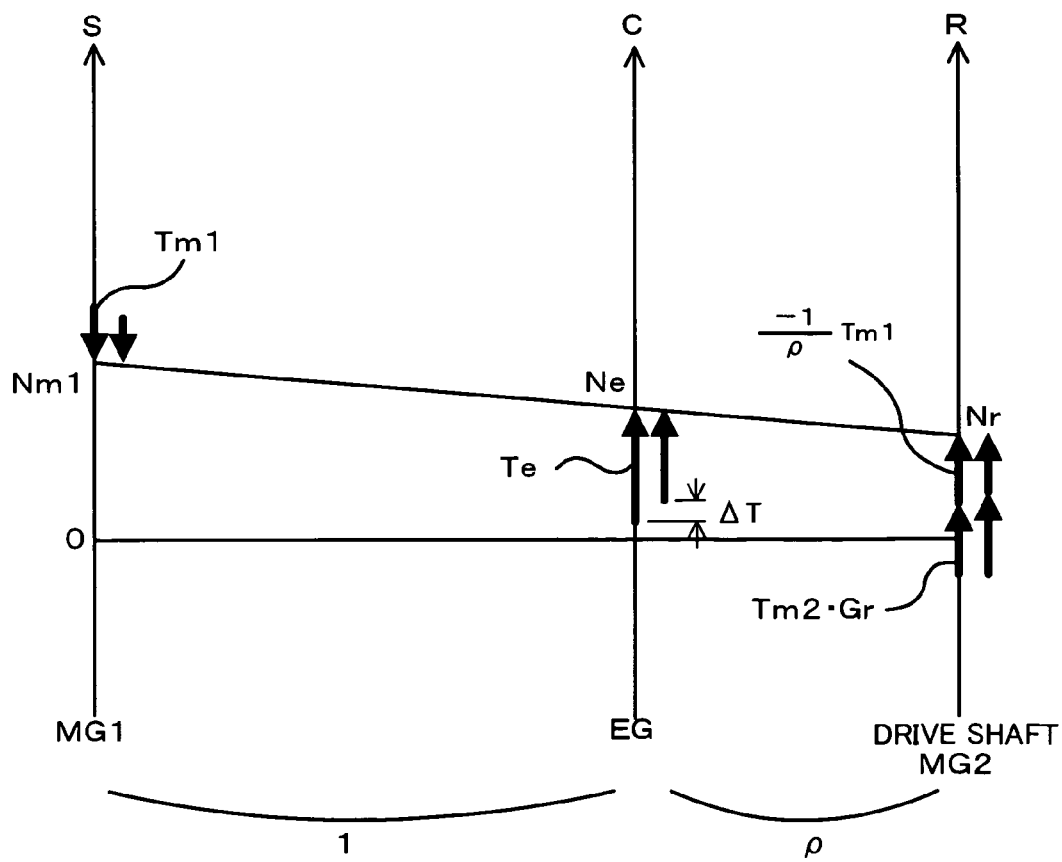
FIG. 10 is an alignment chart showing the dynamic relationship between rotation speed and torque in a rotation element of a power distribution and integration mechanism 30 at the time when a vehicle is running in the state in which power is delivered from an engine 22 in the state in which an exhaust gas switching valve 170 is opened and in the state in which it is closed, shown by being placed side by side.

FIG. 10 is an alignment chart showing the dynamic relationship between rotation speed and torque in a rotation element of the power distribution and integration mechanism 30 at the time when the vehicle is running in the state in which power is delivered from the engine 22 in the state in which the exhaust gas switching valve 170 is opened and in the state in which it is closed, shown by being placed side by side. In FIG. 10, the arrow marks described on the axes of the S axis, C axis, and R axis represent torques acting on the axes when the exhaust gas switching valve 170 is in an open state, and the arrow marks described at the right side of the axes of the S axis, C axis, and R axis represent torques acting on the axes when the exhaust gas switching valve 170 is in a closed state. As shown in FIG. 10, the torque Te from the engine 22 at the time when the exhaust gas switching valve 170 is in a closed state is lower than that at the time when the exhaust gas switching valve 170 is in an open state by the correction torque ΔT, and accordingly the absolute value of the output torque of the motor MG1 also decreases. Therefore, since torque is delivered from the motor MG1, the absolute value of torque acting on the ring gear shaft 32*a* (R axis) also decreases. However, since the torque command Tm2* of the motor MG2 is set so that the torque demand Tr* is delivered to the ring gear shaft 32*a* serving as the drive shaft in the range of the input limit Win to the output limit Wout of the battery 50, even when the exhaust gas switching valve 170 is in a closed state, the torque demand Tr* is delivered to the ring gear shaft 32*a* in the same way as when the exhaust gas switching valve 170 is in an open state.

According to the hybrid vehicle 20 of the embodiment described above, when it is judged that the exhaust gas switching valve 170 is in a closed state, the target rotation speed Ne* of the engine 22 and the target torque Te* are set in the same way as when the exhaust gas switching valve 170 is in an open state to control the engine 22, the correction torque ΔT is set based on the rotation speed Ne of the engine 22 and also the value obtained by subtracting the set correction torque ΔT from the target torque Te* is set as a new target torque Te*, and the torque command Tm1* of the motor MG1 is set so that the engine 22 is operated by the corrected target torque Te* and the target rotation speed Ne* and also the torque command Tm2* of the motor MG2 is set so that the torque demand Tr* is delivered to the ring gear shaft 32a serving as the drive shaft to control the motors MG1 and MG2. Thereby, since the exhaust gas switching valve 170 is in a closed state, even if the output from the engine 22 decreases, the engine 22 and the motors MG1 and MG2 can be controlled properly, and the torque demand Tr* can be delivered to the ring gear shaft 32a serving as the drive shaft. Of course, even when it is judged that the exhaust gas switching valve 170 is in an open state, the engine 22 and the motors MG1 and MG2 can be controlled properly, and the torque demand Tr* can be delivered to the ring gear shaft 32a serving as the drive shaft. As the result, regardless of whether the exhaust gas switching valve 170 is in an open state or in a closed state, the engine 22 and the motors MG1 and MG2 can be controlled properly, and the torque demand Tr* can be delivered to the ring gear shaft 32a serving as the drive shaft.

In the hybrid vehicle 20 of this embodiment, when it is judged that the exhaust gas switching valve 170 is in a closed state, even if an attempt is made to deliver the target torque Te* from the engine 22 when the engine 22 rotates at the rotation speed Ne in the closed state of the exhaust gas switching valve 170, the correction torque ΔT is set based on the rotation speed Ne of the engine 22 as a torque corresponding to the decrease in output caused by the rise in exhaust pressure. However, the configuration may be made such that even if an attempt is made to deliver the target torque Te* from the engine 22, a torque lower than the torque corresponding to the decrease in output caused by the rise in exhaust pressure is set to the correction torque ΔT. In this case, the correction torque ΔT need not be set based on the rotation speed Ne of the engine 22.

In the hybrid vehicle 20 of this embodiment, when it is judged that the exhaust gas switching valve 170 is in a closed state, the correction torque ΔT is set based on the rotation speed Ne of the engine 22. However, the correction torque ΔT may be set based on another parameter such as the target rotation speed Ne* of the engine 22 in addition to the rotation speed Ne of the engine 22. Also, the correction torque ΔT may be set based on another parameter without the use of the rotation speed Ne of the engine 22.

In the hybrid vehicle 20 of this embodiment, when it is judged that the exhaust gas switching valve 170 is in a closed state, the target torque Te* is corrected by the correction torque ΔT based on the rotation speed Ne of the engine 22, by which the torque commands Tm1* and Tm2* of the motors MG1 and MG2 are set. However, the configuration may be made such that when it is judged that the exhaust gas switching valve 170 is in a closed state, not only the target torque Te* but also the target rotation speed Ne* is corrected, and the torque commands Tm1* and Tm2* of the motors MG1 and MG2 are set based on the corrected target torque Te* and target rotation speed Ne*. In this case, both of the target torque Te* and the target rotation speed Ne* may be corrected in the decreasing direction so as to correspond to the decrease in output of the engine 22.

In the hybrid vehicle 20 of this embodiment, the torque command Tm1* of the motor MG1 is set by determining the torque restrictions Tm1min and Tm1max that restrict the temporary torque Tm1tmp of the motor MG1 in the range satisfying Equations (3) and (4), and also the torque command Tm2* of the motor MG2 is set by determining the torque restrictions Tm2min and Tm2max by Equations (7) and (8). However, the configuration may be made such that the motor torque Tm1tmp is set as it is as the torque command Tm1* of the motor MG1 without being restricted by the torque restrictions Tm1min and Tm1max in the range satisfying Equations (3) and (4), and also the torque command Tm2* of the motor MG2 is set by determining the torque restrictions Tm2min and Tm2max by Equations (7) and (8) using the torque command Tm1*. In addition, any method may be used in which the torque commands Tm1* and Tm2* of the motors MG1 and MG2 are set within the range of the input limit Win to the output limit Wout of the battery 50 by using the rotation speed Nm2 of the motor MG2 or a predicted motor rotation speed Nm2est.

In the hybrid vehicle 20 of this embodiment, the motor MG2 is attached to the ring gear shaft 32a serving as the drive shaft via the reduction gear 35. However, the motor MG2 may be attached directly to the ring gear shaft 32a, or the motor MG2 may be attached to the ring gear shaft 32a via a transmission such as a two speeds transmission, a three speeds transmission, a four speeds transmission, or the like instead of the reduction gear 35.

Figure 11:
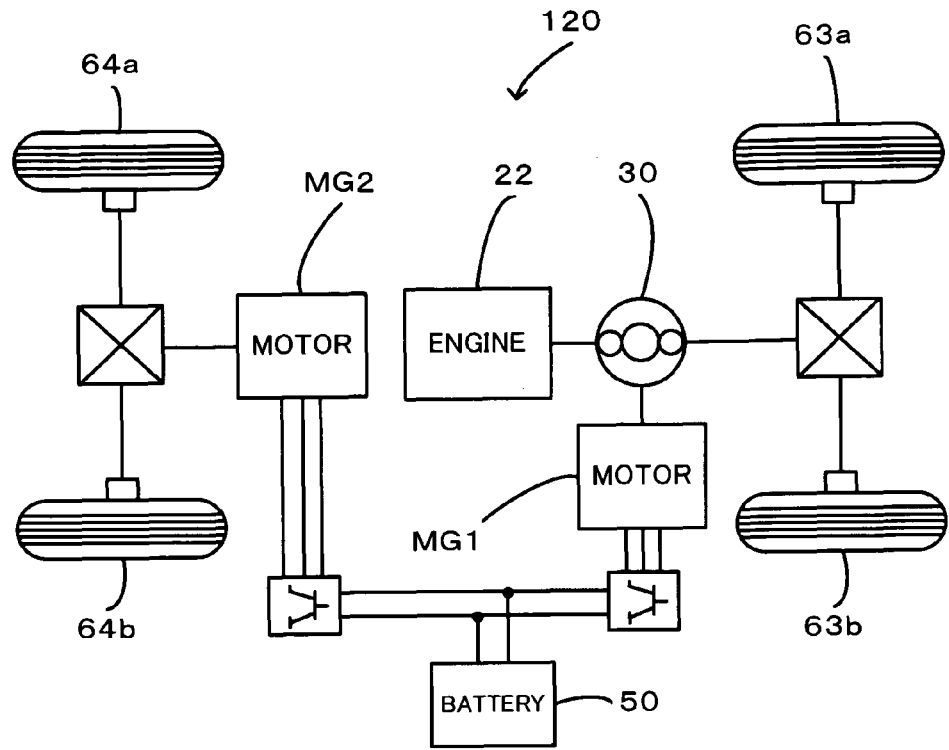
FIG. 11 is a configuration view showing the outline of a configuration of a hybrid vehicle 120 of a modification.

In the hybrid vehicle 20 of this embodiment, the power of the motor MG2 is delivered to the ring gear shaft 32a by accomplishing gear shift by using the reduction gear 35. However, as typically shown in a hybrid vehicle 120 of a modified example shown in FIG. 11, the power of the motor MG2 may be connected to an axle (an axle to which wheels 64a and 64b are connected in FIG. 11) different from the axle to which the ring gear shaft 32a is connected (the axle to which the drive wheels 63a and 63b are connected).

Figure 12:
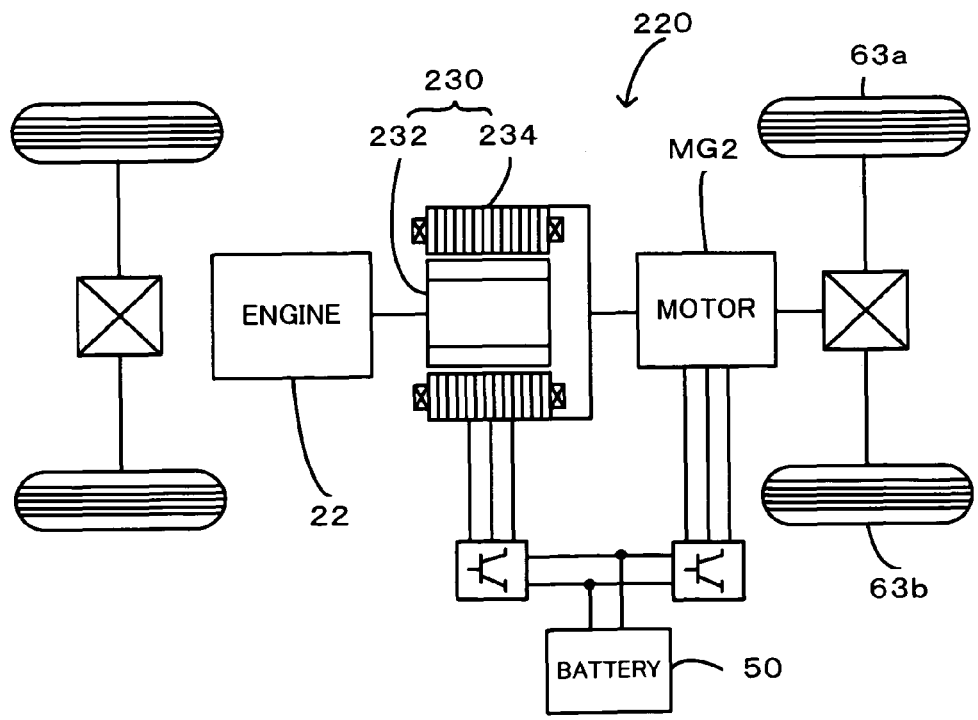
FIG. 12 is a configuration view showing the outline of a configuration of a hybrid vehicle 220 of another modification.

In the hybrid vehicle 20 of this embodiment, the power of the engine 22 is delivered to the ring gear shaft 32a serving as the drive shaft that is connected to the drive wheels 63a and 63b via the power distribution and integration mechanism 30. However, as typically shown in a hybrid vehicle 220 of another modified example shown in FIG. 12, a pair-rotor motor 230 may be provided which has an inner rotor 232 connected to the crankshaft 26 of the engine 22 and an outer rotor 234 connected to the drive shaft for delivering power to the drive wheels 63a and 63b, and transmits some of the power of the engine 22 to the drive shaft and also converts the remaining power into electrical power.

Also, the present invention is not limited to the power output apparatus applied to the hybrid vehicle as described above. The present invention may be applied to a power output apparatus mounted on a mobile object such as a vehicle other than the automobile, ship, and airplane, and may be applied to a power output apparatus incorporated in an immobile facility such as a construction facility. Further, the present invention may be applied to a method for controlling the above-described power output apparatus.

Herein, an explanation is given of the corresponding relationship between the principal elements of the embodiment and the principal elements of the invention described in the section of Summary. In the embodiment, the engine 22 corresponds to an "internal combustion engine", the power distribution and integration mechanism 30 and the motor MG1 correspond to an "electric power-mechanical power input output mechanism", the motor MG2 corresponds to an "electric motor", the battery 50 corresponds to an "accumulator unit", and the second purifier 160 having the catalyst purifying section 164, the HC adsorbing section 168, and the exhaust gas switching valve 170 corresponds to an "exhaust gas purifying unit". The hybrid electronic control unit 70 that executes the processing in Step S110 of the drive control routine shown in FIG. 4 for setting the torque demand Tr* based on the accelerator opening Acc and the vehicle speed V corresponds to a "driving power demand setting unit". The hybrid electronic control unit 70 that executes the processing in Steps S110 through S230 of the drive control routine shown in FIG. 4, in which when it is judged that the exhaust gas switching valve 170 is in an open state, the target rotation speed Ne* and the target torque Te* of the engine 22 are set based on the torque demand Tr* and the operation line on which the engine 22 is operated efficiently and are sent to the engine ECU 24, and the torque command Tm1* of the motor MG1 is set so that the engine 22 is operated by the target torque Te* and the target rotation speed Ne* and also the torque command Tm2* of the motor MG2 is set so that the torque demand Tr* is delivered to the ring gear shaft 32a serving as the drive shaft to send these torque commands to the motor ECU 40, and when it is judged that the exhaust gas switching valve 170 is in a closed state, the target rotation speed Ne* and the target torque Te* of the engine 22 are set in the same way as when it is judged that the exhaust gas switching valve 170 is in an open state and are sent to the engine ECU 24, the correction torque ΔT is set based on the rotation speed Ne of the engine 22 and also the value obtained by subtracting the set correction torque ΔT from the target torque Te* is set as a new target torque Te*, and the torque command Tm1* of the motor MG1 is set so that the engine 22 is operated by the corrected target torque Te* and the target rotation speed Ne* and also the torque command Tm2* of the motor MG2 is set so that the torque demand Tr* is delivered to the ring gear shaft 32a serving as the drive shaft to send these torque commands to the motor ECU 40, the engine ECU 24 that controls the engine 22 by the target torque Te* and the target rotation speed Ne*, and the motor ECU 40 that controls the motors MG1 and MG2 by the torque commands Tm1* and Tm2* correspond to a "control module". Also, the crank position sensor 140 and the engine ECU 24 for calculating the rotation speed Ne of the engine 22 based on the signal from the crank position sensor 140 correspond to an "engine rotation speed detecting module", the motor MG1 corresponds to a "generator", and the power distribution and integration mechanism 30 corresponds to a "three shaft-type power input output module". Also, the pair-rotor motor 230 also corresponds to an "electric power-mechanical power input output mechanism".

The "internal combustion engine" is not limited to an internal combustion engine that delivers power by using a hydrocarbon-based fuel such as gasoline or light oil, and any type of internal combustion engine such as a hydrogen-fueled engine may be used. The "electric power-mechanical power input output mechanism" is not limited to the combination of the power distribution and integration mechanism 30 and the motor MG1 or the pair-rotor motor 230, and any type of mechanism that is connected to the drive shaft and also connected to the output shaft of the internal combustion engine capable of being rotated independently of the drive shaft, and can input and output power to and from the drive shaft and the output shaft along with the input and output of electric power and mechanical power may be used. The "electric motor" is not limited to the motor MG2 configured as a synchronous motor generator, and any type of motor that can input and output power to and from the drive shaft, such as an induction motor, may be used. The "accumulator unit" is not limited to the battery 50, which is a secondary battery, and any type of unit that can give and get electric power to and from the electric power-mechanical power input output mechanism and the electric motor, such as a capacitor, may be used. The "exhaust gas purifying unit" is not limited to the second purifier 160 having the catalyst purifying section 164, the HC adsorbing section 168, and the exhaust gas switching valve 170, and any type of unit that is arranged in the exhaust system of internal combustion engine and has a purification catalyst section having a purification catalyst for purifying exhaust gas, a fuel gas adsorbing section having a fuel gas adsorbent for adsorbing fuel gas in exhaust gas, and a flow switching section for switching from a first flow that allows exhaust gas to flow mainly to the purification catalyst section to a second flow that allows all exhaust gas to flow to the purification catalyst section via the fuel gas adsorbing section and vice versa may be used. The "driving power demand setting unit" is not limited to the unit for setting the torque demand Tr* based on the accelerator opening Acc and the vehicle speed V, and any type of unit that sets the driving power demand required to the drive shaft, for example, a unit that sets the torque demand based on the accelerator opening Acc only, or a unit in which the running path has been set in advance and the torque demand is set based on the running position on the running path may be used. The "control module" is not limited to the combination of the hybrid electronic control unit 70, the engine ECU 24, and the motor ECU 40, and the control module may be configured by a single electronic control unit. Also, the "control module" is not limited to the module in which when it is judged that the exhaust gas switching valve 170 is in an open state, the target rotation speed Ne* and the target torque Te* of the engine 22 are set based on the torque demand Tr* and the operation line on which the engine 22 is operated efficiently to control the engine 22, and the torque command Tm1* of the motor MG1 is set so that the engine 22 is operated by the target torque Te* and the target rotation speed Ne* and also the torque command Tm2* of the motor MG2 is set so that the torque demand Tr* is delivered to the ring gear shaft 32a serving as the drive shaft to control the motors MG1 and MG2, and when it is judged that the exhaust gas switching valve 170 is in a closed state, the target rotation speed Ne* and the target torque Te* of the engine 22 are set in the same way as when the exhaust gas switching valve 170 is in an open state to control the engine 22, the correction torque ΔT is set based on the rotation speed Ne of the engine 22 and also the value obtained by subtracting the set correction torque ΔT from the target torque Te* is set as a new target torque Te*, and the torque command Tm1* of the motor MG1 is set so that the engine 22 is operated by the corrected target torque Te* and the target rotation speed Ne* and also the torque command Tm2* of the motor MG2 is set so that the torque demand Tr* is delivered to the ring gear shaft 32a serving as the drive shaft to control the motors MG1 and MG2. Any type of module in which when the switching state of the flow switching section is a state in which exhaust gas is allowed to flow by the first flow, assuming that the output state of internal combustion engine is the normal state, the internal combustion engine, electric power-mechanical power input output mechanism, and electric motor are controlled so that the driving power based on the driving power demand is delivered to the drive shaft, and when the switching state of the flow switching section is a state in which exhaust gas is allowed to flow by the second flow, assuming that the output state of internal combustion engine is a state in which power cannot be output as compared with the normal state, the internal combustion engine, electric power-mechanical power input output mechanism, and electric motor are controlled so that the driving power based on the driving power demand is delivered to the drive shaft, that is, any type of module in which the internal combustion engine, electric power-mechanical power input output mechanism, and electric motor are controlled so that the driving power based on the driving power demand is delivered to the drive shaft based on the switching state of the flow switching section of the exhaust gas purifying unit, for example, a module in which when it is judged that the exhaust gas switching valve 170 is in a closed state, when an attempt is made to deliver the target torque Te* from the engine 22, a torque lower than the torque corresponding to the decrease in output caused by the rise in exhaust pressure is set to the correction torque $\Delta T$ and also the torque commands Tm1* and Tm2* of the motors MG1 and MG2 are set to control the motors MG1 and MG2, or a module in which when it is judged that the exhaust gas switching valve 170 is in a closed state, the correction torque $\Delta T$ is set based on another parameter such as the target rotation speed Ne* of the engine 22 in addition to the rotation speed Ne of the engine 22 and also the torque commands Tm1* and Tm2* of the motors MG1 and MG2 are set to control the motors MG1 and MG2 may be used. The "engine rotation speed detecting module" is not limited to the unit that calculates the rotation speed Ne of the engine 22 based on the signal from the crank position sensor 140, and any type of module that detects the engine rotation speed, which is the rotation speed of internal combustion engine, for example, a module in which a rotation speed sensor is attached to the crankshaft 26 of the engine 22 to directly detect the engine rotation speed may be used. The "generator" is not limited to the motor MG1 configured as a synchronous motor generator, and any type of motor that can input and output power, such as an induction motor, may be used. The "three shaft-type power input output module" is not limited to the aforementioned power distribution and integration mechanism 30, and any type of module that is connected to the three shafts of the drive shaft, the output shaft, and the rotating shaft of generator and inputs and outputs power, based on the power input to and output from any two shafts of the three shafts, to and from the remaining shaft, such as a module using a double-pinion type planetary gear mechanism, a module that is connected to four or more shafts by combining a plurality of planetary gear mechanisms, or a module having differential operation different from the planetary gear like a differential gear, may be used.

The corresponding relationship between the principal elements of the embodiment and the principal elements of the invention described in the section of Summary is one example for specifically explaining the best mode for the embodiment for carrying out the invention described in the section of Summary, and therefore does not restrict the elements of the invention described in the section of Summary. That is to say, the invention described in the section of Summary should be interpreted based on the description in that section. The embodiment is merely one specific example of the invention described in the section of Summary.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2007-84737 filed Mar. 28, 2007 including specification, drawings and claims is incorporated herein by reference in its entirety.

What is claimed is:

1. A power output apparatus for delivering power to a drive shaft, said power output apparatus comprising:
    an internal combustion engine;
    an electric power-mechanical power input output mechanism which is connected to said drive shaft and also rotatably connected to an output shaft of said internal combustion engine independently of said drive shaft to input and output power to and from said drive shaft and said output shaft along with the input and output of electric power and mechanical power;
    an electric motor capable of delivering power to said drive shaft;
    an accumulator unit capable of sending and receiving electric power to and from said electric power-mechanical power input output mechanism and said electric motor;
    an exhaust gas purifying housing which is arranged in an exhaust system of said internal combustion engine, and has a purification catalyst section having a purification catalyst for purifying exhaust gas disposed within the housing on an outlet side, a fuel gas adsorbing section having a fuel gas adsorbent for adsorbing fuel gas in exhaust gas disposed within the housing on an inlet side, and a flow switching section for switching from a first flow that allows exhaust gas to flow mainly to said purification catalyst section of the housing to a second flow that allows all exhaust gas to flow to said purification catalyst section via said fuel gas adsorbing section of the same housing and vice versa;
    a driving power demand setting unit for setting a driving power demand required to said drive shaft; and
    a control module for controlling said internal combustion engine, said electric power-mechanical power input output mechanism, and said electric motor so that a driving power based on said set driving power demand is delivered to said drive shaft based on a switching state of said flow switching section of said exhaust gas purifying unit,
    wherein said power output apparatus further comprises an engine rotation speed detecting module for detecting an engine rotation speed, which is a rotation speed of said internal combustion engine, and
    wherein said control module is a module for setting a target rotation speed and a target torque by correcting said target torque by a correction amount that is larger as said detected engine rotation speed is higher when the switching state of said flow switching section is a state in which exhaust gas is allowed to flow by said second flow.

2. The power output apparatus according to claim 1, wherein said control module is a module for controlling said internal combustion engine, said electric power-mechanical power input output mechanism, and said electric motor so that a driving power based on said set driving power demand is delivered to said drive shaft assuming that an output state of said internal combustion engine is a normal state when the switching state of said flow switching section is a state in which exhaust gas is allowed to flow by said first flow, and controlling said internal combustion engine, said electric power-mechanical power input output mechanism, and said electric motor so that a driving power based on said set driving power demand is delivered to said drive shaft assuming that the output state of said internal combustion engine is a state in which power cannot be delivered as compared with said normal state when the switching state of said flow switching section is a state in which exhaust gas is allowed to flow by said second flow.

3. The power output apparatus according to claim 2, wherein said control module is a module for controlling said internal combustion engine, said electric power-mechanical power input output mechanism, and said electric motor so that a target rotation speed and a target torque of said internal combustion engine are set based on said set driving power demand and a predetermined restriction, said internal combustion engine is operated by said set target rotation speed and target torque, and a driving power based on said set driving power demand is delivered to said drive shaft when the switching state of said flow switching section is a state in which exhaust gas is allowed to flow by said first flow, and controlling said internal combustion engine, said electric power-mechanical power input output mechanism, and said electric motor so that a target rotation speed and a target torque are set by being corrected in the output decreasing direction from a target rotation speed and a target torque set based on said set driving power demand and said predetermined restriction, said internal combustion engine is operated by said set target rotation speed and target torque, and a driving power based on said set driving power demand is delivered to said drive shaft when the switching state of said flow switching section is a state in which exhaust gas is allowed to flow by said second flow.

4. The power output apparatus according to claim 3, wherein said control module is a module for setting a target rotation speed and a target torque by correcting only said target torque so as to be small when the switching state of said flow switching section is a state in which exhaust gas is allowed to flow by said second flow.

5. The power output apparatus according to claim 1, wherein said exhaust gas purifying unit is a unit in which said purification catalyst section is arranged over the whole of a rear stage of the flow path of exhaust gas and also said fuel gas adsorbing section is arranged in a part of a front stage of the flow path of exhaust gas, and said flow switching section is attached to a remaining portion of said front stage of the flow path of exhaust gas of said exhaust gas purifying unit and is provided with a valve for opening and closing said remaining portion.

6. The power output apparatus according to claim 1, wherein said electric power-mechanical power input output mechanism is a mechanism having a generator for inputting and outputting power and a three shaft-type power input output module that is connected to said drive shaft, said output shaft, and a rotating shaft of said generator, and inputs and outputs power, based on a power input to and output from any two shafts of said three shafts, to and from the remaining shaft.

7. A vehicle comprising:
an internal combustion engine;
an electric power-mechanical power input output mechanism which is connected to a drive shaft connected to an axle and also rotatably connected to the output shaft of said internal combustion engine independently of said drive shaft to input and output power to and from said drive shaft and said output shaft along with the input and output of electric power and mechanical power;
an electric motor capable of delivering power to said drive shaft;
an accumulator unit capable of sending and receiving electric power to and from said electric power-mechanical power input output mechanism and said electric motor;
an exhaust gas purifying housing which is arranged in an exhaust system of said internal combustion engine, and has a purification catalyst section having a purification catalyst for purifying exhaust gas disposed within the housing on an outlet side, a fuel gas adsorbing section having a fuel gas adsorbent for adsorbing fuel gas in exhaust gas disposed within the housing on an inlet side, and a flow switching section for switching from a first flow that allows exhaust gas to flow mainly to said purification catalyst section of the housing to a second flow that allows all exhaust gas to flow to said purification catalyst section via said fuel gas adsorbing section of the same housing and vice versa;
a driving power demand setting unit for setting a driving power demand required to said drive shaft; and
a control module for controlling said internal combustion engine, said electric power-mechanical power input output mechanism, and said electric motor so that a driving power based on said set driving power demand is delivered to said drive shaft based on a switching state of said flow switching section of said exhaust gas purifying unit,
wherein said power output apparatus further comprises an engine rotation speed detecting module for detecting an engine rotation speed, which is a rotation speed of said internal combustion engine, and
wherein said control module is a module for setting a target rotation speed and a target torque by correcting said target torque by a correction amount that is larger as said detected engine rotation speed is higher when the switching state of said flow switching section is a state in which exhaust gas is allowed to flow by said second flow.

8. A method for controlling a power output apparatus including an internal combustion engine; an electric power-mechanical power input output mechanism which is connected to a drive shaft and also rotatably connected to the output shaft of said internal combustion engine independently of said drive shaft to input and output power to and from said drive shaft and said output shaft along with the input and output of electric power and mechanical power; an electric motor capable of delivering power to said drive shaft; an accumulator unit capable of sending and receiving electric power to and from said electric power-mechanical power input output mechanism and said electric motor; and an exhaust gas purifying housing which is arranged in an exhaust system of said internal combustion engine, and has a purification catalyst section having a purification catalyst for purifying exhaust gas disposed within the housing on an outlet side, a fuel gas adsorbing section having a fuel gas adsorbent for adsorbing fuel gas in exhaust gas disposed within the housing on an inlet side, and a flow switching section for switching from a first flow that allows exhaust gas to flow mainly to said purification catalyst section of the housing to a second flow that allows all exhaust gas to flow to said purification catalyst section via said fuel gas adsorbing section of the same housing and vice versa, in which
when the switching state of said flow switching section is a state in which exhaust gas is allowed to flow by said first flow, assuming that the output state of said internal combustion engine is a normal state, said internal combustion engine, said electric power-mechanical power input output mechanism, and said electric motor are controlled so that a driving power based on a driving power demand required to said drive shaft is delivered to said drive shaft, and when the switching state of said flow switching section is a state in which exhaust gas is allowed to flow by said second flow, assuming that the output state of said internal combustion engine is a state in which power cannot be delivered as compared with said normal state, said internal combustion engine, said electric power-mechanical power input output mechanism, and said electric motor are controlled so that a driving power based on said driving power demand is delivered to said drive shaft,
wherein said power output apparatus further comprises an engine rotation speed detecting module for detecting an engine rotation speed, which is a rotation speed of said internal combustion engine, and wherein said control module is a module for setting a target rotation speed and a target torque by correcting said target torque by a correction amount that is larger as said detected engine rotation speed is higher when the switching state of said flow switching section is a state in which exhaust gas is allowed to flow by said second flow.

* * * * *